Patented Sept. 28, 1937

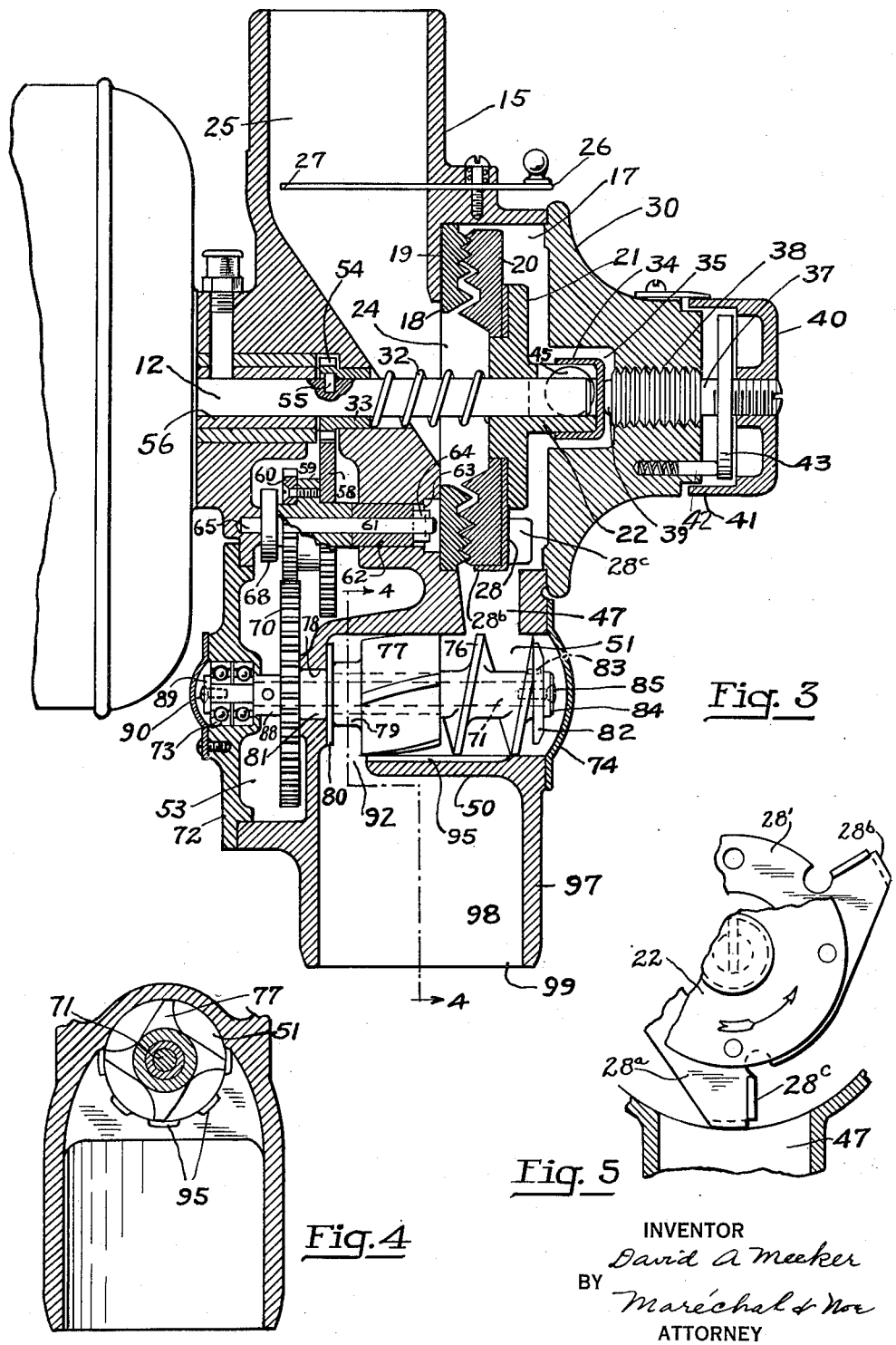

2,094,548

UNITED STATES PATENT OFFICE 2,094,548

FOOD HANDLING APPARATUS

David A. Meeker, Troy, Ohio, assignor to The Hobart Manufacturing Company, Troy, Ohio, a corporation of Ohio Application June 15, 1932, Serial No. 617,269

11 Claims. (Cl. 83—18)

This invention relates to grinding mills of the type for grinding coffee and the like.

One of the principal objects of the invention is to provide a grinding mill of this type which is simple and economical in construction, efficient in operation, prevents separation of the chaff from the ground bean to provide a substantially homogeneous ground material, obviates objectionable air currents resulting from the grinding operation, and discharges the ground material from the mill in a uniform and controlled manner free from objectionable electrostatic charges.

Another object of the invention is to provide a mill of this character for grinding material in package lots particularly for the retail trade which is adapted to grind a predetermined amount of material and discharge it in a satisfactory and uniform manner directly into the consumer's container of a predetermined size, and in which the mill and the discharge therefrom is adapted to accommodate the increase in bulk of the material due to grinding and before close packing to prevent overflow from the consumer's container which is of a size to receive the predetermined amount of ground material when closely packed.

Still another object of the invention is to provide a mill of this character having grinding burrs discharging directly into a conveyor of comparatively short length, in which the parts are compactly arranged to provide for economy of space and secure the ultimate discharge of ground material from the conveyor without substantial time lag after the material has passed through the burrs, and at a location close to the mill support or pedestal for the convenient support of cans or bags to receive the ground material.

Other objects and advantages of the invention will be apparent from consideration of the description, the drawings and the appended claims.

In the drawings, in which like characters of reference are used to designate like parts throughout the several views thereof—

Fig. 3 is a vertical sectional view on an enlarged scale taken on the plane of the line 3—3 of Fig. 2;

Fig. 4 is a partial vertical sectional view taken on the plane of the line 4—4 of Fig. 3; and Fig. 5 is an end elevational view of the grinding burr and wipers of the mill, the discharge passage therefrom being shown in section.

Figure 1:
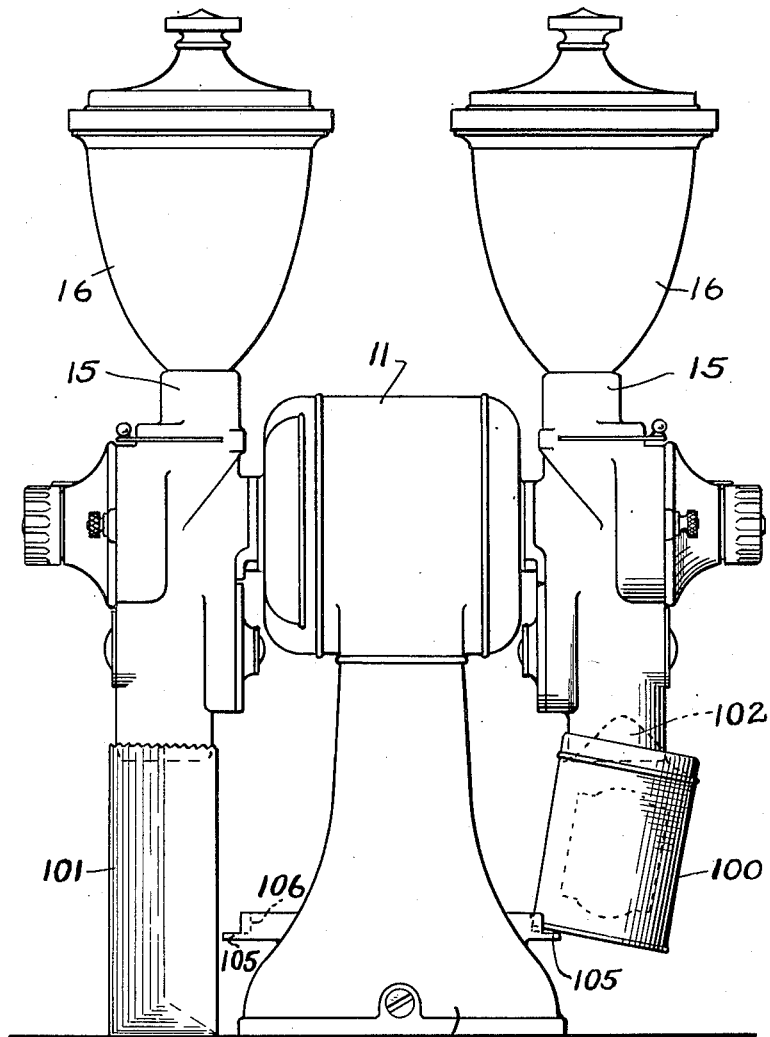
Fig. 1 is a side elevational view of a grinding mill constructed in accordance with this invention.
Figure 2:
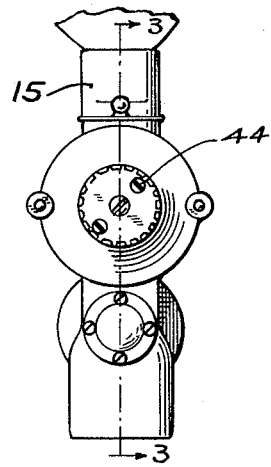
Fig. 2 is an end elevational view of a burr case of the mill shown in Fig. 1.

Referring to the drawings, which disclose a preferred embodiment of the invention, the numeral 10 indicates a standard or pedestal, supporting an electric motor 11 having an armature or drive shaft 12 rotatably supported in the motor bearings and extended at opposite ends. Supported at opposite ends of the motor casing are mill or burr casings 15 having hoppers 16 for the feed of coffee and the like to be ground. As is customary, one of the burr cases may be equipped with granulating burrs and the other with pulverizing burrs, or both may have like equipment. The machine may be constructed with a single burr case unit instead of the double arrangement shown, in which event the end of the motor opposite the burr case may be of conventional design without shaft extension.

As both burr casings are of identical construction, except oppositely disposed, detailed description of one only is given. Referring to Fig. 3, the grinding elements are mounted within a burr chamber 17 formed within the casing 15, and comprise a fixed burr 18 bolted or fastened to an annular wall 19 of the casing, and a rotatable cooperating burr 20 mounted on a collar or back plate 21 having an extended sleeve portion 22 surrounding the shaft 12. The wall 19 and burr 18 are cut away to provide a central feeding opening 24 for the supply of material to be ground from the neck 25 centrally into the grinding elements where it is then thrown outwardly by centrifugal force and passes through the cooperating teeth of the burrs 18 and 20 and is finely ground thereby. A sliding gate or plate 26 mounted in a slot 27 in the casing 15 is adapted to control communication of the hopper 16 with the grinding burrs. The rotatable burr 20 is provided on its rear side with wiper blades 28 for facilitating the discharge of the ground material from the burr chamber 17.

As shown more particularly in Fig. 5, the wipers may be formed by stamping out a sheet metal annular ring 28′ having a plurality of outwardly extending lips 28ª, with an outer edge 28ᵇ and a side edge 28ᶜ of each lip bent over at right angles and in opposite directions. The annular ring 28′ is clamped between burr 20 and collar 21, with the outer edge 28ᵇ of each lip snugly fitting over the periphery of burr 20, and the side edge 28ᶜ standing out at right angles to form a blade on the rear side of burr 20 within chamber 17 providing a positive expelling action for discharge of the ground material upon rotation of the burr and wipers.

The outer end of the burr receiving chamber 17 is closed by a removable front case 30 which is bolted to the casing 15 in any suitable manner. The rotatable burr 20 and collar 21 are axially slidable along shaft 12, and are urged outwardly along the shaft by a coil spring 32 bearing at one end against the pinion sleeve 33 and at the other end against collar 21. The extent of outward sliding movement of the rotatable burr 20 is limited by a cup member 34 positioned within a chamber 35 formed in front case 30, the rearwardly opening portion of the cup surrounding the sleeve 22 in spaced relationship. The position of the cup member 34 is controlled by a screw 37 threaded at 38 into front case 30 and having a projecting end 39 which bears against the cup 34. The outer end of screw 37 has fastened thereon a control knob 40 carrying a flange portion 41 which overlaps the end of front case 30, and which provides means for manually adjusting the position of the screw 37 to thereby control and adjust the spacing of the rotatable burr 20 from the stationary burr 18 for regulating the fineness of size of the ground coffee. The control knob is resiliently maintained in adjusted position by means of a spring pressed plunger, indicated at 42, mounted within a forwardly opening socket in front case 30, the plunger bearing against a plate 43 fastened to the adjusting knob 40 by screws 44. The rotating burr 20 and its supporting collar 21 are keyed to rotate with drive shaft 12 by means of an automatic release mechanism such as that shown in the patent to Johnston 1,502,675, dated July 29, 1924, so that should any hard or metallic objects get into the grinding burrs, the connecting key will be sheared off to thereby prevent injury to the hardened burrs. As shown, the outer end of shaft 12 is provided with a diametrically arranged slot, and the sleeve portion 22 of collar 21 is also provided with a slot on one side thereof and in alignment with the slot in the shaft. In these slots is mounted a frangible disk, such as a copper disk 45, which thereby forms a key to rotatably connect the parts, and which disk is adapted to shear off when excessive strains are applied thereto.

The construction of mill described thus far is that shown in the Johnston patent referred to above, being merely illustrative of a suitable form of grinding mill adapted for the grinding of coffee, and any other conventional construction of grinding elements and drive therefor can be utilized in lieu thereof. When such a mill is used to grind coffee, the resulting ground material is composed mainly of two distinguishable parts consisting of the heavier particles of ground bean, and a light flaky material coming from a membrane-like structure near the center of the bean and known as the "chaff". As the rotatable grinding burr operates at very high speed, the centrifugal action of the mill tends to produce suction at the intake 24, resulting in the drawing in of air currents which are discharged through the outlet or discharge passage 47. In the usual type of coffee mill for the retail trade, the discharge 47 is arranged to feed directly into a large can or container which generally has an inwardly flaring restricted upper end to receive the ground coffee. The operator then pours the ground coffee from this receiving can into the container or bag in which the ground coffee is supplied to the customer or consumer. The air currents produced by the grinding operation tend to separate the heavier ground bean from the lighter and flaky chaff, and a portion of the chaff is blown out of the container about the room. Moreover, the chaff acquires an electrostatic charge during the grinding operation which causes it to adhere particularly to the inside of the burr case and the upper wall portions of the receiving container, until a quantity of sufficient weight accumulates to cause it to fall in a mass. When the operator empties this container into the consumer's can or bag, the heavier ground bean portion of the coffee discharges readily leaving behind a substantial amount of the chaff adhering to the walls. The usual and natural procedure on the part of the operator is to tap the container gently in order to discharge any remaining coffee therein, and this results in shaking loose the chaff which falls in a mass onto the top of the ground coffee. The result is that the consumer receives a non-uniform package of ground coffee, in which the chaff is largely present in separated masses marring the appearance of the ground product. The presence of the chaff in the ground coffee is unobjectionable, provided it is uniformly and homogeneously mixed throughout the mass of ground coffee.

The mill disclosed herein is constructed to prevent the separation of the chaff from the ground bean as it is discharged from the grinding burrs, as well as to obviate the objection of the electrostatic charge acquired by the chaff and to alter the color and appearance of the chaff by a rubbing and agitating action to make it conform more closely to the color and appearance of the ground bean, to thereby give a substantially homogeneous mixture uniform in appearance. The mill also obviates the objectionable air currents at the discharge, which currents not only tend to blow the lighter material out of the receiving container and around the room, but also are instrumental in causing the separation of the chaff from the ground bean, so that the ground coffee falls quietly without dissemination into the receiving container. As shown, a cylindrical extension 50 is carried by and preferably formed integral with casing 15, providing a conveyor chamber 51 of circular cross section within which is positioned a conveyor. Rotation is imparted to the conveyor from drive shaft 12 through a train of gears mounted in a gear chamber 53 also formed within casing 15. A pinion 54, which may be integral with the sleeve 33, is connected to rotate with shaft 12 by a pin 55 fixed in the shaft on the outer side of a bearing sleeve 56, the pin extending into a cooperating slot in the wall of the sleeve and pinion. The helical spring 32 bearing against sleeve 33 not only resiliently holds sleeve 33 and pinion 54 in proper position as well as resiliently holding burrs 18 and 20 in their adjusted position, but also has a conveying action which carries material into the grinding burrs preventing bridging in the throat of the mill, and keeping small particles that may be present in the coffee from working back into the gearing.

Meshing with pinion 54 is a large gear 58 removably mounted on hub 59, the latter also removably carrying a pinion 60. This forms an idler gear assembly adapted to be inserted in place as a unit, and which provides for independently replacing either gear in case of breakage or wear. The idler unit runs on a stationary spindle 61 which is slidably mounted within bushing 62 pressed into burr case 15. Spindle 61 is provided at its end with a slot which registers with slots 63 formed in bushing 62, and a cotter key 64 passes through the aligned slots to thereby prevent rotation of spindle 61. The other end of spindle 61 rests within a blind hole 65 in case 15, thereby providing for easy disassembly of the idler unit by removing burr 18, and sliding spindle 61 to the right (as shown in Fig. 3), whereupon the idler unit will be free. A wide spacing washer 68 mounted on spindle 61 spaces the idler unit from the gear case, and being separate from the idler unit further facilitates ready removal of the unit by providing additional space within the gear chamber. Pinion 60 meshes with a large drive gear 70 on the conveyor shaft 71. A removable cover plate 72 closes the gear chamber and in addition carries ball bearings 73 that support the conveyor.

The conveyor shaft 71 is formed of uniform diameter throughout its length, with the exception of a stepped portion of smaller diameter mounted within the ball bearings 73. The outer end of the conveyor chamber 51 is closed by a removable cover 74 providing for access to and removal of the conveyor members carried by the conveyor shaft. These members comprise a single thread worm 76 of large pitch or short lead at the outer end of the chamber 51 beneath the discharge 47, and a multiple thread worm 77 of small pitch or long lead adjacent the inner or discharge end of the conveyor chamber 51. These worms are hollow and have a slidable fit on shaft 71, and are preferably formed separately for ease in manufacture and are then connected together to make a one piece conveyor that can be inserted upon or removed from shaft 71 as a unit. Worm 77 has a sleeve extension 79 bearing against a washer 80, spacing these parts from the inner wall of the conveyor chamber 51 which is provided with an opening 78 through which shaft 71 passes. A close fitting seal ring 81 is provided within opening 78 about shaft 71 to prevent leakage of lubricant from the gear chamber into the conveyor passage, and to prevent ingress of coffee dust into the gearing. The connected worms are fastened to shaft 71 to rotate therewith by means of a driving disk 82 provided with a D shaped or other suitably shaped bore engaging a flat side on the end of shaft 71, the disk 82 carrying a dowel 83 that enters a hole in the end of worm 76. A washer 84 and screw 85 retain the parts on shaft 71. Drive gear 70 is pinned to shaft 71 within the gear chamber, and is provided with a sleeve extension 88, between the end of which and a washer 89 the inner ball races of the ball bearings 73 are clamped by a screw 90. Additional support for the conveyor shaft is provided by a close fit of the worm 76 within the cylindrical extension 50. The construction provides a positive drive for the conveyor, and at the same time makes disassembly easy by removal of cover 74 and screw 85, whereupon the connected conveyor worms and the washer 80 may be slipped out through the outer end of chamber 51. The shaft 71 together with drive gear 70 and ball bearings 73 may be removed as a unit with cover 72.

This construction thus provides a feeding conveyor which has a quick or rapid feed adjacent the intake end beneath the discharge 47 from the burrs, and a slow feed adjacent the outlet end of the conveyor, where a passage 92 is formed through the bottom wall of the conveyor chamber for the discharge of the ground material. This provides for the accumulation of a mass of ground coffee within the flutes of the worm 77 to fill the conveyor passage adjacent the discharge end of the conveyor during operation of the grinding device, thereby choking the conveyor against the passage of air currents through the discharge. The conveyor is so constructed and its driving rate through the interconnected gearing is so coordinated with the operation of the grinding burrs, that the normal feeding rate of the conveyor, when separately operated is somewhat less than the normal grinding rate of the burrs. For example, very satisfactory results are obtained when using grinding burrs capable of grinding one pound of coffee to a desired fineness in 20 seconds, when a conveyor is provided which is capable of feeding one pound of the ground coffee to the discharge thereof in approximately 30 seconds. But when the conveyor is connected directly to the discharge of the grinding burrs as shown, the pressure of the discharge resulting from centrifugal force and the action of the wipers 28c results in speeding up the feeding rate of the conveyor to make it commensurate with the grinding rate of the burrs, so that the conveyor is then capable of carrying the capacity of the grinding burrs. Thus, in the example mentioned above, the conveyor when constructed in the manner described, properly feeds the ground material to the discharge in substantially 20 seconds.

At the same time, the conveyer adjacent the discharge end thereof and opposite the slow feed worm 77, remains filled with the ground coffee, and the pressure of the feed resulting from the grinding burrs and the rapid feed worm 76 produces somewhat of a packing action of the ground coffee adjacent the discharge. The slow feed worm 77, by reason of its construction to feed toward the discharge, prevents a jamming action such as to cause stopping of the drive, while at the same time the multiple blades, shown to be four in number, produce an agitation of this packed mass of coffee which rubs the mixed ground material and chaff together and against the casing wall. This action effectively discharges the electrostatic charge acquired by the chaff, so that the ground material as ultimately discharged at 92 is substantially free from any objectionable electric charge which causes it to cling or adhere to the side walls of the receiving container. This may be due in part to the fact that the ground bean acquires an opposite charge from that of the chaff, and the rubbing of these materials together under pressure in the conveying chamber produces contact over substantially the entire exposed surface of the chaff and the ground bean particles to effectively neutralize the charges over their exposed surfaces, whereas otherwise considerable charge would be retained due to the fact that both the chaff and the ground bean are good electrical insulators. Also, some of the charge is undoubtedly neutralized by rubbing contact with the casing wall.

The effective rubbing action to secure electric discharge and the prevention of objectionable jamming of the coffee mass, is further facilitated by the provision of longitudinal grooves 95 in the side and bottom of the conveying chamber 51, which not only serve as accumulating spaces for the excess ground material but also serve as frictional retarding surfaces for the mass of coffee tending to rotate with the conveyor worm 77 when confined between the flutes thereof. This provides an effective rolling and agitating action which turns over the particles and presents all their faces to rubbing contact. Such action has the further advantage of coating the flakes of chaff with particles of coffee to thereby alter the color and appearance of the chaff such as to cause it to more closely simulate the color and appearance of the ground bean. As the action of the wipers 28 coupled with the conveying action of feed worm 76 serve to prevent separation of chaff from ground bean, but rather deliver these materials forwardly toward the discharge end of the conveyor just as received from the grinders and consequently in the proportions in which these materials are present in the original bean, a substantially homogeneous mixture of ground bean and chaff of uniform color and proportions is ultimately delivered from the conveyor. By reason of this construction, the conveyor may be of comparatively small length as shown, so that it can be confined within the ordinary extent of the burr casing to give a compact mill of small size, and to secure discharge of the ground material from the conveyor without any substantial time lag after the material has passed through the grinding burrs. The conveyor is also preferably arranged as shown to feed the material from the burrs back toward the mill pedestal, so that the ultimate discharge for the ground material is positioned adjacent the mill pedestal to provide for the convenient location of a supporting means for the container receiving the ground material.

The present invention affords the further advantage of collecting the ground material directly in the consumer's container of a predetermined size for receiving the amount of coffee being ground. The present machine is particularly advantageous for use by retail merchants, who commonly carry their stocks of coffee in the whole bean, and grind the product to the fineness desired by the customer at the moment of delivery. They are called upon to grind numerous lots of one pound or two pounds or other predetermined small amounts, for the individual customers. The merchant is provided with consumer's containers, such as cans or bags, of a predetermined size to hold the amount of coffee being ground at each particular instance. Thus, in the case where the customer calls for one pound of ground coffee, a one pound size of can or bag is placed beneath the discharge opening 92 to receive the stream of ground coffee as discharged, and is then sold directly to the consumer after placing the cover on the can or tying or otherwise sealing the bag. This has the further advantage of preventing such separation of the chaff from the ground coffee as may take place in the pouring of the ground materials from one container into another. Moreover, some retail merchants carry their stocks of coffee in the whole bean already packaged in cans or bags of one pound or other predetermined small size. This construction enables the merchant to open a can or bag of coffee in the whole bean of the weight called for by the customer, pour the contents into the receiving hopper of the mill, and then grind the coffee and collect the ground coffee in the same bag or can in which it was packed in the whole bean.

In accordance with the present invention, further economy is effected by providing for the direct utilization of consumer's containers of the minimum volume capacity for any predetermined amount of coffee being ground. It is well known that upon the grinding of a predetermined amount of coffee, the bulk of the ground coffee without close packing is substantially greater than the bulk of the original coffee beans. The present invention provides a storage reservoir space or hopper about the discharge opening 92 from the mixing conveyor to accommodate this increase in bulk. As shown, the casing 15 is provided with a depending annular flange 97 forming a cylindrical storage space 98 of substantial volume within the confines of flange or hopper 97. This hopper has an opening 99 at its lower end through which the ground material from the discharge 92 is adapted to pass into the consumer's container. The container, which may be a can as indicated at 100, or a bag as shown at 101, is positioned with the upper end thereof surrounding the lower end of the hopper 97. The result is that the excess of ground loosely discharged material, which would otherwise overflow from the container, which is of an economical size to receive the predetermined amount only after close packing, accumulates and is confined within the storage reservoir hopper 97 as indicated at 102. During or after the grinding operation, the operator gently taps the can or container, causing a closer packing of the ground mass therein so as to receive the excess confined within the storage hopper.

Due to the absence of objectionable air currents at the discharge, a small size consumer's container can be satisfactorily utilized without objection of the ground material being blown out of the container and about the room, while at the same time the mixed chaff and ground coffee is prevented from stratifying or separating by reason of the fact that objectionable electrical charges acquired by the ground material are dissipated within the conveyor. The machine is further constructed to provide for the convenient support of containers of various heights with the upper ends thereof surrounding the discharge hopper. Preferably the size and proportions of the discharge hopper 97 are such that a standard one pound coffee bag 101 will rather snugly fit over the peripheral wall of the hopper to thereby maintain the bag in open position against the normal tendency of the bag to collapse and flatten out along its folds, and the height of the lower end of the hopper above the counter or other support on which the machine rests is such that the standard bag can rest on the counter or support and its upper end will be somewhat above the elevation of the lower end of the hopper. In addition, on each side of pedestal 10 is mounted at a suitable height a can or carton support comprising a horizontally extending shelf 105 having a vertical rear wall 106 of arcuate shape which preferably approximates the shape of a one pound coffee can. The length of the shelf 105 is such that it terminates short of the vertical projection of hopper 97 and therefore does not interfere with the locating of a bag 101 in filling position, as shown at the left hand side of Fig. 1. The shelf 105 may be made vertically adjustable on the pedestal, if desired, and is so positioned that the upper rim of a can or carton 100 resting on the shelf finds additional support against hopper 97, as shown at the right hand side of Fig. 1. A package or can of homogeneously mixed ground coffee and chaff is thus directly available to the customer without additional handling or trouble. Where consumers' containers of somewhat increased volume for the predetermined amount of coffee being ground are used, the storage reservoir hopper may be eliminated, and the ground material discharged directly from the opening 92 into the consumer's container.

In operation, the merchant takes from his shelves, say a one pound package of coffee in the whole bean. This is opened and the contents are poured into hopper 16, shutoff plate 26 being closed at this time. The empty container is then set under the discharge hopper 97. If the container is a bag 101, it may rest upon the counter or sub-base, and its top snugly encircles the hopper 97. If the container is a can or carton 100, it is set on the can rest 105 with its upper rim finding further support against the periphery of hopper 97. Shutoff 26 is now opened and grinding begins. The coffee beans fall down through throat 24, pass between burrs 18 and 20 where reduction takes place, and the ground coffee is discharged under the combined action of centrifugal force and wipers 28 through passage 47 into the conveyor. Here the quick feed worm 76 picks up the ground material, and coupled with the pressure of discharge from the mill accentuated by the wipers 28ᶜ forces the ground material into the space between the threads of the slow feed worm 77, where the rubbing and agitating action previously described takes place, thereby choking the conveyor and effectively discharging the electrical charge of the ground material. The homogeneously mixed ground coffee and chaff falls from the discharge in a uniform quiet stream into the receiving container. Any excess over the capacity of the container, due to increase in volume upon grinding, piles up within the reservoir hopper 97, and this is then closely packed into the container by gently tapping the side of the container. The container is then sealed and is in condition for delivery to the customer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A coffee mill of the character described, comprising in combination, rotatable grinding burrs, a feeding inlet for supplying coffee to be ground to said burrs and a discharge therefrom, a conveyor chamber having an intake adjacent one end thereof and in direct communication with the discharge from said grinding burrs and within the effective range of air currents from said burrs said chamber also having a discharge adjacent the other end, and a feeding means in said chamber providing for a controlled accumulation of ground material including a single thread short lead worm adjacent the intake end of the chamber, and a multiple thread long lead worm adjacent the discharge end of the chamber.

2. A coffee mill of the character described, comprising in combination, grinding burrs, a feeding inlet for supplying coffee to be ground to said burrs and a discharge therefrom, a conveyor chamber having an intake adjacent one end thereof and in communication with the discharge from said grinding burrs and a discharge adjacent the other end, and a feeding means therein including a single thread short lead worm adjacent the intake end of the chamber, a multiple thread long lead worm adjacent the discharge end of the chamber, and material accumulating groove formed within the inner wall of the chamber adjacent the discharge end thereof and opposite the said multiple thread long lead worm.

3. A grinding mill of the character described comprising a unitary casing member, a hopper formed in said casing, rotating grinding burrs located in said casing, a conveyor chamber formed in said casing directly adjacent said grinding burrs, a discharge outlet from said chamber also formed in said casing, a driven shaft within said chamber, a feed worm slidably mounted on said shaft, readily removable means for interconnecting said feed worm with said shaft to rotate therewith, and a removable cover for the end of said chamber to provide access thereto and through which said feed worm may be slid from said shaft upon release of said removable interconnecting means.

4. A coffee mill of the character described adapted to receive coffee from a container filled with coffee in bean form, to grind the coffee and to discharge it into the same container, comprising in combination, a casing, grinding burrs therein, means for operating the grinding burrs, a feeding hopper for supplying coffee to be ground to said burrs, and a discharge for the ground coffee from the casing in functional juxtaposition to the grinding burrs including a storage reservoir hopper of substantial volume having a lower opening adapted to be inserted in the upper end of the container receiving the discharged ground coffee, means providing for accumulation of ground coffee and chaff in the casing prior to passage to said storage reservoir hopper to avoid the segregation of the ground bean and chaff by the forces set up during the grinding operation the volume of the storage reservoir hopper being coordinated with the normal increase in volume of the coffee when ground without close packing so that the hopper holds and confines the excess which would otherwise overflow from the container, whereby the operator by tapping the side of the container can closely pack the ground coffee in the container so that it will then receive and hold the excess confined in the storage reservoir hopper.

5. A coffee mill of the character described adapted to grind coffee and discharge the ground coffee directly into a consumer's container of a predetermined size for receiving the amount of coffee being ground, comprising in combination, a casing, grinding burrs therein, means for operating the grinding burrs, a feeding hopper for supplying coffee to be ground to said burrs, a discharge for the ground coffee in functional juxtaposition to the grinding burrs including a storage reservoir hopper of substantial volume having a lower opening adapted to be inserted in the upper end of the consumer's container receiving the discharged ground coffee, the volume of the storage reservoir hopper being coordinated with the normal increase in volume of the coffee when ground without close packing so that the hopper holds and confines the excess which would otherwise overflow from the consumer's container, whereby the operator by tapping the side of the container during or after the grinding operation can closely pack the ground coffee in the container so that it will then receive and hold the excess confined in the storage hopper, and means to choke the discharge from the casing to eliminate the passage of air currents normally produced by the operation of the grinding burrs through said storage reservoir hopper.

6. A coffee mill of the character described adapted to grind coffee and discharge the ground coffee directly into a consumer's container of a predetermined size for receiving the amount of coffee being ground, comprising in combination, grinding burrs, means for operating the grinding burrs, a feeding hopper for supplying the coffee to be ground to the burrs, a conveyor chamber having an intake in close functional juxtaposition to the discharge from the grinding burrs and an outlet, feeding means within the chamber providing for the accumulation of ground material therein to choke the passage of air currents normally produced by operation of the grinding burrs, and a storage reservoir hopper of substantial volume receiving the ground material from the outlet of the chamber and having an opening in the lower end thereof which is adapted to be inserted into the upper end of the consumer's container, the volume of the storage reservoir hopper being coordinated with the normal increase in volume of the coffee when ground without close packing that the hopper holds and confines the excess which would otherwise overflow from the consumer's container, whereby the operator by tapping the side of the container can closely pack the ground coffee in the container so that it will then receive and hold the excess confined in the storage reservoir hopper.

7. A coffee mill of the character described adapted to grind coffee and discharge the ground coffee directly into a consumer's container of a predetermined size for receiving the amount of coffee being ground, comprising in combination, grinding burrs, means for operating the grinding burrs, a feeding hopper for supplying the coffee to be ground to the burrs, a conveyor chamber having an intake adjacent one end in communication with the discharge from the grinding burrs and an outlet adjacent the other end, feeding means within the chamber including a quick feed member adjacent the intake end of the chamber and a slow feed compacting and agitating member adjacent the outlet end of the chamber for the accumulation of ground coffee and chaff adjacent the outlet end thereof to choke the chamber and for the agitating and rubbing of the ground material together and against the chamber wall to discharge electrical charges acquired by the material during the grinding operation, and a storage reservoir hopper of substantial volume receiving the ground material from said outlet of the chamber and having an opening in the lower end thereof which is adapted to be inserted into the upper end of the consumer's container, the volume of the storage reservoir hopper being coordinated with the normal increase in volume of the coffee when ground without close packing so that the hopper holds and confines the excess which would otherwise overflow from the consumer's container.

8. A coffee mill of the character described, comprising a pedestal, a motor mounted thereon, a burr casing mounted at one side of said motor, grinding burrs therein, means for supplying coffee to be ground to said grinding burrs, a discharge hopper depending from said burr case of a size adapted to fit within a standard receiving bag of predetermined capacity, said discharge hopper having a lower opening arranged at such an elevation above the counter or sub-base on which the mill is supported that said bag can be positioned on said counter or sub-base with the upper end thereof encircling said hopper, and a stationary support carried by said pedestal above said counter or sub-base and adapted to receive a standard can or carton of similar capacity but of smaller height than said bag with the upper end of the can or carton encircling said hopper, said support being offset from the vertical projection of said hopper so as to be out of the way of said standard bag when located in filling position.

9. A coffee grinding mill of the character described, comprising in combination, a grinding means provided with a feeding inlet for material to be ground and a discharge therefrom, a conveyor chamber having an intake adjacent one end and a discharge adjacent the other end thereof, the discharge from the grinding means opening directly into the intake of said chamber, and a feeding means within the chamber including quick feed means adjacent the intake end of the chamber and slow feed means adjacent the discharge of the chamber, said means comprising members rigidly mounted on a common drive shaft and said quick feed means comprising a worm screw conveyor, and said other feed means comprising separated small pitch blades arranged generally angularly spaced around a zone at the discharge end of the chamber and both said means extending out to terminate adjacent the inner surface of the chamber, and said second feed means having surfaces extending generally longitudinally of the chamber and inclined with respect to the axis thereof, the inclination or pitch of the said elements being such that the worm in the portion adjacent the intake end feeds the material at a more rapid rate than the blades adjacent the discharge end, both of said means feeding toward the discharge end of the chamber and arranged to operate at a speed coordinated with a rate of inflow from the grinding means into the chamber to provide that the normal rate of feed of said worm and blades is less than the rate of inflow into the chamber, whereby a compacting and intermixture of the ground bean and chaff is secured.

10. A coffee grinding mill of the character described comprising in combination, a grinding device provided with an outlet, a generally imperforate conveyor chamber having an intake at one end and a free and open discharge adjacent its opposite end, the outlet from the grinding device opening directly into the intake of said chamber, means within said chamber effective upon the entire body of ground coffee and chaff therein for feeding the same therethrough, said means operating to feed the ground material toward the outlet end of the chamber at a rate substantially equal to the rate of discharge of the ground coffee to the chamber from the grinding burrs, and means within said chamber beyond said first named means and adjacent the discharge end of the chamber for agitating the ground material while retarding its rate of movement towards the discharge, the said last named means comprising relatively wide bladed members angularly disposed with respect to the longitudinal axis of the chamber and extending along the length thereof to provide for positive feeding movement of the body of ground material toward the discharge end of the chamber at a rate of feed that is somewhat slower than that of said first named means, the differential in rate of feed of the two said means being sufficient to compact and retard the discharge of the entire mass of ground material in its movement over and along the said surfaces, whereby during the operation of the grinding mill, the said chamber remains filled with ground material adjacent its discharge end, the said feeding and agitating means cooperating to effect rapid self-emptying of said chamber at the termination of the grinding operation by positive progressive bodily movement of the contained material in the form of a homogeneous mass to said discharge.

11. A coffee grinding mill of the character described comprising in combination, a grinding device provided with an outlet, a generally imperforate conveyor chamber having an intake at one end and a free and open discharge adjacent its opposite end, the outlet from the grinding device opening directly into the intake of said chamber, discharge means operatively associated with said grinding device providing a positive expelling action for discharge of ground material away from said grinding device and directly into the intake of said chamber, means within said chamber effective upon the entire body of ground coffee and chaff therein for feeding the same therethrough, said means operating to feed the ground material toward the outlet end of the chamber at a rate substantially equal to the rate of discharge of the ground coffee to the chamber from the grinding burrs, and means within said chamber beyond said first named means and adjacent the discharge end of the chamber for agitating the ground material while retarding its rate of movement towards the discharge, the said last named means comprising relatively wide bladed members angularly disposed with respect to the longitudinal axis of the chamber and extending along the length thereof to provide for positive feeding movement of the body of ground material toward the discharge end of the chamber at a rate of feed that is somewhat slower than that of said first named means, the differential in rate of feed of the two said means being sufficient to compact and retard the discharge of the entire mass of ground material in its movement over and along the said surfaces, whereby during the operation of the grinding mill, the said chamber remains filled with ground material adjacent its discharge end, the said feeding and agitating means cooperating to effect rapid self-emptying of said chamber at the termination of the grinding operation by positive progressive bodily movement of the contained material in the form of a homogeneous mass to said discharge.

DAVID A. MEEKER.